(12) United States Patent
Zhang et al.

(10) Patent No.: US 12,240,349 B2
(45) Date of Patent: Mar. 4, 2025

(54) SYSTEMS AND METHODS FOR ESTIMATING STATE OF HEALTH OF AN ENERGY STORAGE DEVICE

(71) Applicant: Cummins Inc., Columbus, IN (US)

(72) Inventors: Ruigang Zhang, Bagersville, IN (US); Guodong Fan, Columbus, IN (US); Richard A. Booth, Columbus, IN (US)

(73) Assignee: Cummins Inc., Columbus, IN (US)

(*) Notice: Subject to any disclaimer, the term of this patent is extended or adjusted under 35 U.S.C. 154(b) by 763 days.

(21) Appl. No.: 17/321,767

(22) Filed: May 17, 2021

(65) Prior Publication Data
US 2021/0268932 A1 Sep. 2, 2021

Related U.S. Application Data

(63) Continuation of application No. PCT/US2019/017620, filed on Feb. 12, 2019.

(51) Int. Cl.
B60L 58/13 (2019.01)
B60L 50/62 (2019.01)
(Continued)

(52) U.S. Cl.
CPC ............ B60L 58/13 (2019.02); B60L 50/62 (2019.02); H01M 10/48 (2013.01); H02J 7/0048 (2020.01); H02J 7/005 (2020.01); H02J 7/007194 (2020.01); B60L 2240/545 (2013.01); B60L 2240/549 (2013.01); H01M 10/486 (2013.01)

(58) Field of Classification Search
CPC .... B60L 58/13; B60L 50/62; B60L 2240/545; B60L 2240/549; H02J 7/007194; H02J 7/0048; H02J 7/005

USPC ........................................................ 320/137
See application file for complete search history.

(56) References Cited

U.S. PATENT DOCUMENTS 4,325,010 A * 4/1982 Lowndes ............... G01R 23/15
320/136
7,928,736 B2 4/2011 Yun et al.
(Continued)

FOREIGN PATENT DOCUMENTS

GB 2 000 596 A 1/1979

OTHER PUBLICATIONS

International Search Report and Written Opinion for International Application No. PCT/US2019/017620, mail date Apr. 23, 2019, 11 pages.
(Continued)

Primary Examiner — Nathaniel R Pelton
(74) Attorney, Agent, or Firm — Foley & Lardner LLP

(57) ABSTRACT

A system for determining a state of health (SOH) of an energy storage device comprises a controller configured to be coupled to the energy storage device. The controller is configured to determine a current value drawn by or supplied to the energy storage device over a predefined period of time. In response to the current value not satisfying a current threshold, the controller determines a current gain factor and determines an adjusted current value from the determined current value based on the current gain factor. The controller is configured to determine an estimated SOH of the energy storage device based on the adjusted current value, and indicate the estimated SOH on a user interface.

20 Claims, 7 Drawing Sheets

(51) Int. Cl.
 *H01M 10/48* (2006.01)
 *H02J 7/00* (2006.01)

(56) References Cited

U.S. PATENT DOCUMENTS

| | | |
|---|---|---|
| 9,625,528 B2 | 4/2017 | Nugent et al. |
| 9,714,984 B2 | 7/2017 | Kim |
| 9,766,297 B2 | 9/2017 | Frost et al. |
| 9,766,298 B2 | 9/2017 | Lennevi et al. |
| 9,772,382 B2 | 9/2017 | Walter et al. |
| 11,658,354 B2 * | 5/2023 | Murphy ................. G01N 23/04 |
| | | 320/132 |
| 2005/0046388 A1 * | 3/2005 | Tate ..................... G01R 31/367 |
| | | 320/132 |
| 2010/0121587 A1 * | 5/2010 | Vian .................... H01M 10/48 |
| | | 702/63 |
| 2011/0025258 A1 * | 2/2011 | Kim .................... H01M 10/425 |
| | | 320/128 |
| 2012/0208672 A1 | 8/2012 | Sujan et al. |
| 2013/0274984 A1 | 10/2013 | Justin et al. |
| 2015/0377976 A1 * | 12/2015 | Maluf .................. G01R 31/392 |
| | | 702/63 |
| 2017/0067967 A1 | 3/2017 | Bryngelsson et al. |
| 2017/0146606 A1 * | 5/2017 | Neelam .............. G01R 31/3842 |

OTHER PUBLICATIONS

1st Office Action, with English translation for corresponding Chinese Patent Application No. 2019800755464, issued Nov. 15, 2023, 17 pages.

* cited by examiner

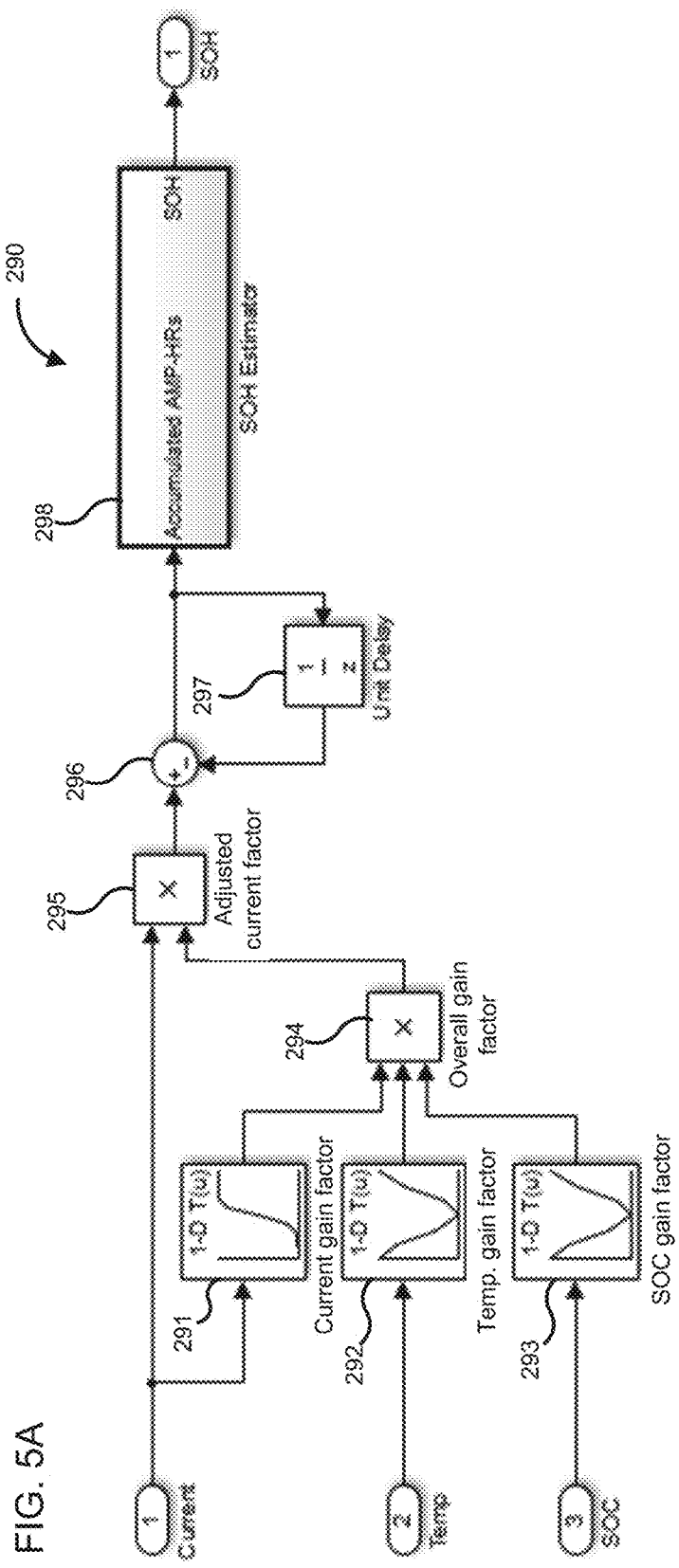
FIG. 5A
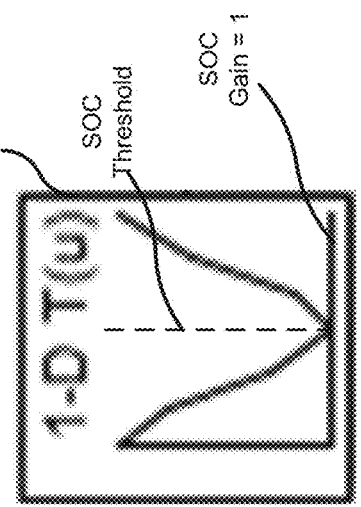
FIG. 5C
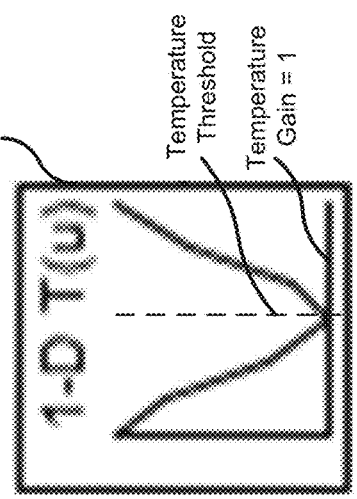
FIG. 5D
FIG. 5B

SYSTEMS AND METHODS FOR ESTIMATING STATE OF HEALTH OF AN ENERGY STORAGE DEVICE

CROSS REFERENCE TO RELATED APPLICATION

The present application is a continuation of PCT Application No. PCT/US2019/017620, filed Feb. 12, 2019, which is incorporated herein by reference in its entirety.

TECHNICAL FIELD

The present disclosure relates generally to control systems for estimating a state of health of energy storage devices, and in particular to energy storage devices included in electric vehicles or hybrid vehicles.

BACKGROUND

Electric vehicles, and hybrid vehicles such as plug-in hybrid electric vehicles (PHEV) or range extender electric vehicles (REEVs) include energy storage devices which provide electric energy to a motor to drive the vehicle. Energy storage device manufacturers specify a calendar life of the energy storage device, and the amount of life remaining in the energy storage device is depicted as a state of health (SOH) of the energy storage device. SOH is a figure of merit of a condition of the energy storage device (e.g., a battery or battery pack) compared to its ideal conditions, i.e., when the energy storage device is initially manufactured. A new energy storage device has a SOH of 100% and progressive use of the energy storage device leads to a drop in the SOH of the battery, corresponding to degradation in the energy storage capacity of the energy storage device due to chemical reactions therein. Accurate estimation of the SOH is important for accurately determining a remaining life of the energy storage device.

SUMMARY

Embodiments described herein relate generally to systems and methods for estimating a SOH of an energy storage device, and in particular to systems and methods configured to determine a current gain factor, a temperature gain factor and/or a state of charge (SOC) gain factor, determining an adjusted current value based on one or more of these gain factors, and determining a cumulative adjusted current value based on a plurality of the adjusted current values, the cumulative adjusted current value being used to determine an estimated SOH of the energy storage device.

In some embodiments, a system for determining a state of health (SOH) of an energy storage device comprises a controller configured to be coupled to the energy storage device. The controller is configured to determine a current value drawn from or supplied to the energy storage device over a predefined period of time. In response to the current value not satisfying a current threshold, the controller is configured to determine a current gain factor, and determine an adjusted current value from the determined current value based on the current gain factor. The controller is configured to determine an estimated SOH of the energy storage device based on the adjusted current value, and indicate the estimated SOH of the energy storage device on a user interface.

In some embodiments, a vehicle comprises an energy storage device, and a controller. The controller is configured to determine a current value drawn from or supplied to the energy storage device over a predefined period of time. In response to the current value not satisfying a current threshold, the controller is configured to determine a current gain factor, and determine an adjusted current value from the determined current value based on the current gain factor. The controller is configured to determine an estimated SOH of the energy storage device based on the adjusted current value, and selectively drive the vehicle via a traction motor using power drawn from the energy storage device based on the estimated SOH of the energy storage device.

In some embodiments, a method for determining a state of health (SOH) of an energy storage device comprises determining a current value drawn from or supplied to the energy storage device over a period of time. In response to the current value not satisfying a current threshold, a current gain factor is determined. An adjusted current value is determined from the determined current value based on the current gain factor. An estimated SOH of the energy storage device is determined based on the adjusted current value, and the estimated SOH of the energy storage device is indicated on a user interface.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF FIGURES

The foregoing and other features of the present disclosure will become more fully apparent from the following description and appended claims taken in conjunction with the accompanying drawings. Understanding that these figures depict only several implementations in accordance with the disclosure and are therefore not to be considered limiting of its scope, the disclosure will be described with additional specificity and detail through use of the accompanying drawings.

FIG. 5A is a schematic block diagram showing various operations used in the SOH estimation block of FIG. 4, according to an embodiment; FIG. 5B shows a plot of current gain factor versus current input or drawn from an energy storage device; FIG. 5C shows a plot of temperature gain factor versus operating temperature of the energy storage device; and FIG. 5D shows a plot of the SOC gain factor versus SOC of the energy storage device.

Figure 1:
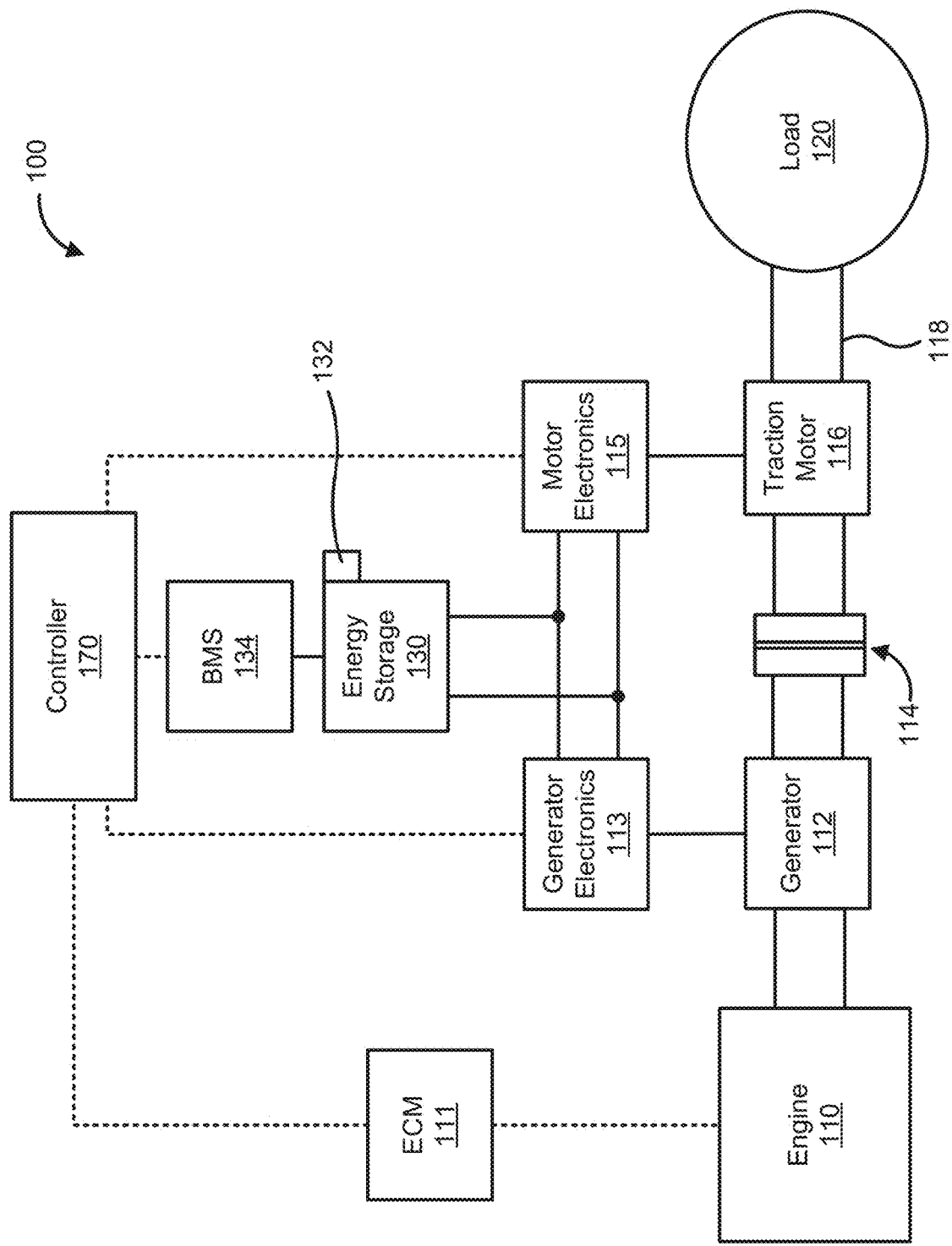
FIG. 1 is a schematic illustration of a system comprising an energy storage device and a controller, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for estimating a SOH of an energy storage device, and in particular to systems and methods configured to determine a current gain factor, a temperature gain factor and/or a state of charge (SOC) gain factor, determining an adjusted current value based on one or more of these gain factors, and determining a cumulative adjusted current value based on a plurality of the adjusted current values, the cumulative adjusted current value being used to determine an estimated SOH of the energy storage device.

Conventionally, SOH of energy storage devices is based on a nominal current (amperage) draw or input into the energy storage device over time (e.g., per hour), regardless of the conditions under which the battery is operating in. However, charging or discharging the battery at high current values or high rates of speed, at extreme temperatures or under low or high state of charge (SOC) conditions can lead to higher degradation of the battery.

Expanding further, in hybrid vehicles, the load between an engine of the vehicle and the energy storage device is based on a number of factors. One of these factors is the current SOH of the battery relative to the desired SOH of the battery. SOH is calculated as a progressive use of current-hours (amp-hours), e.g., a Coulomb or current counter is run every time current is drawn from or supplied to the energy storage device and the counter is added up, and used to determine SOH (i.e., remaining life of the battery in amp-hours). An energy storage device is generally rated for an expected number of discharge cycles over its lifetime. Generally, a nominal currently value is used, which may be an experimentally or theoretically predetermined current value. It should be appreciated that SOH represents long term capability of an energy storage device.

In an energy storage device (e.g., a battery), current is being constantly or nearly constantly input and drawn out from the energy storage device. For example, current may be supplied to the energy storage device when driving the vehicle, and when battery is recharging, for example, through regenerative braking. SOH decreases with calendar age of the energy storage device. SOH estimation can be used to determine load sharing between an engine and generator of a hybrid vehicle. If estimated SOH is better than predicted SOH, than more efficiency can be gained by allowing more power to be run from the energy storage device, and vice versa.

However, there are instances where one Amp-hour of charge input or drawn from the energy storage device may be more or less damaging than another Amp-hour. For example, the SOH determined based at a certain charge rate (C-rate) and amp-hours accumulated at a higher C-rate will be more damaging to the battery, and amp-hours accumulated at a lower C-rate will be less damaging. If temperature is at a nominal operating temperature of the energy storage device (e.g., within a nominal operating temperature range), and state-of-charge (SOC) is at a nominal SOC (e.g., at a nominal SOC value such as 50% SOC, or within a nominal SOC range such as between 10% SOC and 90% SOC), the current draw or input into the energy storage device is at a nominal current value, that may be the Amp-hour that is least likely damaging to the energy storage device. If the energy storage device is run too close to the high or low limits of the battery SOC even if everything else is the same, Amp-hour drawn at such SOCs costs a little bit more in SOH of battery relative to what is estimated based on the nominal current. Similarly, if temperature is above or below a temperature threshold, then the Amp-hour draw or input into the energy storage device under such conditions is also more damaging to the energy storage device, and therefore a decline in the SOH is higher than what is determined using a nominal current draw.

Various embodiments of the systems and methods described herein may provide benefits including, for example: (1) providing accurate estimation of SOH of an energy storage device based on actual current drawn from or input into the energy storage device, SOC and temperature of the energy storage device; (2) allowing accurate estimation of remaining life of the energy storage device; and (3) allowing more efficient distribution of power between an engine and energy storage device of a hybrid vehicle, allowing extension of life of the energy storage device.

FIG. 1 is a schematic illustration of a system 100 including an engine 110, a generator 112, an energy storage device 130 and a controller 170. The system 100 may be included in an electrified vehicle (e.g., a hybrid vehicle, a plug-in-hybrid vehicle, a REEV, etc.). In other embodiments, the system 100 may be an electrical power production system, for example, a backup grid power generation system or a portable power generation system (e.g., a residential backup power generation system). In some embodiments, the system 100 includes a REEV which is designed to primarily operate on electric power. For example, the system 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, motorbikes, three wheelers and any other type of vehicle structured to use electric power as the main electromotive force to drive a load 120 (e.g., wheels of the vehicle). Thus, the present disclosure is applicable with a wide variety of implementations.

The engine 110 is coupled to a generator 112, and configured to provide mechanical power to the generator 112. The engine 110 may include an internal combustion ("IC") engine which converts fuel (e.g., diesel, gasoline, natural gas, biodiesel, ethanol, liquid petroleum gas or any combination thereof) into mechanical energy. The engine 110 may include a plurality of piston and cylinders pairs (not shown) for combusting the fuel to produce mechanical energy. Furthermore, the engine 110 may be coupled to the generator 112 via a shaft so as to generate electric power. The generator 112 may include an alternating current (AC) generator (e.g., an alternator such as a wound rotor or permanent magnet alternator configured to convert a rotational mechanical power produced by the engine 110 into electrical energy). The generator 112 is configured to produce an electrical output, for example, a current that is proportional to the speed or torque provided by the engine 110 to the generator 112.

The electric current may be used to selectively recharge the energy storage device 130, or selectively provide electric power to a traction motor 116 coupled to the load 120 via a transmission shaft 118, to drive the traction motor 116. The traction motor 116 may include an electric motor (e.g., a DC motor) coupled to the load 120 (e.g., wheels) of the system 100. While shown as including a single traction motor 116, the system 100 may include a plurality of traction motors coupled to the load 120 (e.g., a traction motor 116 coupled to a portion of wheels or each wheel of a vehicle included the system 100).

In some embodiments, a clutch 114 is provided between the engine 110 and the traction motor 116. The clutch 114 may be selectively engaged to mechanically couple the load 120 to the engine 110 so as to cause the load 120 to be mechanically driven by the engine 110, for example, when a charge in the battery drops below a certain threshold or when a high load is exerted on the system 100.

The energy storage device 130 may include a battery (e.g., Li-ion battery, a Li-air battery, a Li-sulfur battery, a Na-ion battery or any other suitable energy storage device) or a battery pack configured to store electric charge and selectively provide electric charge to the traction motor 116 to drive the load 120. In the example shown, the energy storage device 130 is a battery. The energy storage device 130 is electrically coupled to the generator 112 via generator electronics 113 and configured to selectively receive current or charge input therefrom to recharge the energy storage device 130. The generator electronics 113 may include an AC to direct current (DC) convertor, amplifiers or any other electronic instrumentation configured to provide a stable current to the energy storage device 130.

Furthermore, the energy storage device 130 is coupled to the traction motor 116 via motor electronics 115 configured to provide current to the traction motor 116 based on a load demand on the traction motor 116. For example, as a load demand on the traction motor 116 increases, the energy storage device 130 may increase an amount of current provided to the traction motor 116 (e.g., to increase a rotational speed of the traction motor 116 to allow the vehicle including the system 100 to be driven faster). As shown in FIG. 1, the generator 112 is also coupled to the traction motor 116 via the generator electronics 113 and the motor electronics 115 to allow selective driving of the traction motor 116 via current delivery thereto from the generator 112.

A battery management system (BMS) 134 is communicatively coupled to the energy storage device 130 and configured to monitor and/or control (e.g., in response to commands from the controller 170) the energy storage device 130. The BMS 134 may include any suitable electronic circuitry and/or algorithm(s) configured to monitor various operating parameters of the energy storage device 130 and protect the energy storage device 130 from operating outside its safe operating parameters (e.g., theoretically or experimentally determined safe operating parameters). Thus, the BMS 134 may include one or more sensors, virtual or real, configured to determine the operating parameters of the energy storage device 130. The operating parameters may include, for example, a voltage (e.g., total voltage, voltage of individual cells included in the energy storage device 130, minimum and maximum cell voltage, voltage of periodic current draw, etc.), temperature (e.g., average temperature, intake or output temperature of a coolant used to cool the energy storage device 130 and/or temperature of individual cells) via temperature sensor 132, SOC or depth of discharge (DOD) to indicate a charge level of the energy storage device 130, SOH, state of power (SOP) which indicates an amount of power available for a defined time interval given a current power usage, temperature and other conditions, coolant flow (e.g., for air or fluid cooled energy storage device), current flow into or out of the energy storage device 130 and/or any other operational parameters battery.

The SOC of the energy storage device 130 is defined as its available capacity (i.e., amount of charge present in the energy storage device 130) of the battery as a percentage of a predetermined reference value (e.g., a calibrated capacity value, an experimentally or theoretically predetermined capacity value, a rated capacity or a present capacity based on most recent charge-discharge cycle of the energy storage device 130). SOC is a measure of short term capability of the energy storage device 130 and indicates the amount of electrical energy (i.e., charge) left in the battery as a percentage of the electrical energy the energy storage device 130 stored when it was completely charged.

In contrast, SOH corresponds to a long term health of the energy storage device 130. During the lifetime of an energy storage device, its performance or health tends to deteriorate gradually due to irreversible physical and chemical changes which take place with usage and with age until eventually the battery is no longer usable or dead. The SOH is an indication of the point which has been reached in the life cycle of the energy storage device 130 and a measure of its condition relative to a fresh battery. For example, as the current is drawn from or supplied to the energy storage device 130, the SOH of the energy storage device 130 decreases. The energy storage device 130 may have a rated calendar life corresponding to total Amp-hours that the energy storage device 130 is capable of providing over its lifetime which corresponds to 100% SOH. The Amp-hours progressively decreases as current is drawn or input into the energy storage device 130.

The BMS 134 may also be configured to determine secondary data based on one or more of the determined operational parameters of the energy storage device 130. Such data may include maximum discharge current as a charge current limit (CCL), maximum discharge current as a discharge current limit (DCL), energy (kWh) delivered since last charge or charge cycle, internal impedance of a cell of the energy storage device 130, charge (Amp-Hr) delivered or storage, total energy delivered since first use, total operating time since first use, total number of cycles etc. In other embodiments, such calculations may be performed by the controller 170. The BMS 134 may also be configured to control recharging of the energy storage device 130 (e.g., based on instructions from the controller 170) by selectively coupling or uncoupling the energy storage device 130 from the generator 112, and electrically isolating the energy storage device 130 from the generator 112 and the traction motor 116 in response to energy storage device 130 operating outside the safe operating parameters (e.g., based on instructions from the controller 170).

In some embodiments, an electronic control module (ECM) 111 may be coupled to the engine 110 and configured to control operations of the engine 110. The electronic control module 111 may include any suitable computing device including one or more processors and/or memory configured to monitor and/or control operating parameters of the engine 110. Such operating parameters may include engine speed, engine torque, acceleration/deceleration rate, air/fuel ratio (e.g., for lean, rich or stoichiometric operation), compression ratio, valve timing, etc. In other embodiments, the controller 170 may be configured to perform the operations of the ECM 111. In such embodiments, the ECM 111 may be excluded.

As shown in FIG. 1, the controller 170 is coupled to the engine 110 via the ECM 111, the generator 112 via the generator electronics 113, the traction motor 116 via the motor electronics 115 and the energy storage device 130 via the BMS 134. The controller 170 may be operatively coupled to the engine 110, the generator electronics 113, the motor electronics 115 and the BMS 134 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the systems and components of the system 100 as shown in FIG. 1, the controller 170 is structured to receive data regarding one or more of the components shown in FIG. 1. For example, the data may include a current value drawn by or supplied to the energy storage device 130, a temperature of the energy storage device 130, and a SOC of the energy storage device 130. The controller 170 may determine an estimated SOH of the energy storage device 130, and a power split between the energy storage device 130 and electrical power provided by the generator 112 via the engine 110, or mechanical power provided by the engine 110 via the clutch 114.

For example, the controller 170 may be configured to determine a current value drawn from or supplied to the energy storage device 130 over a period of time. For example, the controller 170 may receive information from the BMS 134 corresponding to the current value (e.g., determined by a current sensor included in the BMS 134) and determine the current value input or extracted from the energy storage device 130 over the period of time (i.e., charge) in Amp-hr. The determined current value is an instantaneous measured current value, measured at a particular point in time. In some embodiments, the current value is an absolute current value such that current drawn from or supplied to the energy storage device 130, both deplete the SOH of the energy storage device 130.

In response to the current value not satisfying a current threshold, the controller 170 is configured to determine a current gain factor. The current threshold may include a nominal current value (e.g., a fixed current value or a range of current values) that the energy storage device 130 is rated for, and the current value not satisfying the current threshold includes the current value deviating from the nominal current value. The nominal current value may correspond to a predetermined amount of reduction in SOH of the energy storage device 130 every time or nearly every time current is drawn from or supplied to the energy storage device 130 at the nominal current value.

The current threshold (e.g., nominal current value or value range) may include a predefined value, a calibrated value, a theoretically or an experimentally determined value based on observations from similar energy storage devices. In some embodiments, the current threshold is based on a total capacity of the energy storage device 130, a rated number of cycles of the energy storage device 130, and a rated life of the energy storage device 130. For example, the nominal current value that may be used as the current threshold may be determined using the following equation:

$$\text{Nominal Current} = \frac{\text{Total Charge Capacity(Amp. Hrs)}}{\text{Total Expected Life(Hrs)}}$$

Supplying or extracting current from the energy storage device 130 at a current value higher than the current threshold causes greater damage to the energy storage device 130 relative to supplying or extracting current from the energy storage device 130 at the current threshold. Conversely, supplying or extracting current from the energy storage device 130 at current value lower than the current threshold results in less damage to the energy storage device 130. Conventional systems however, do not account for this higher or lower damage when determining SOH of an energy storage device.

Figure 3:
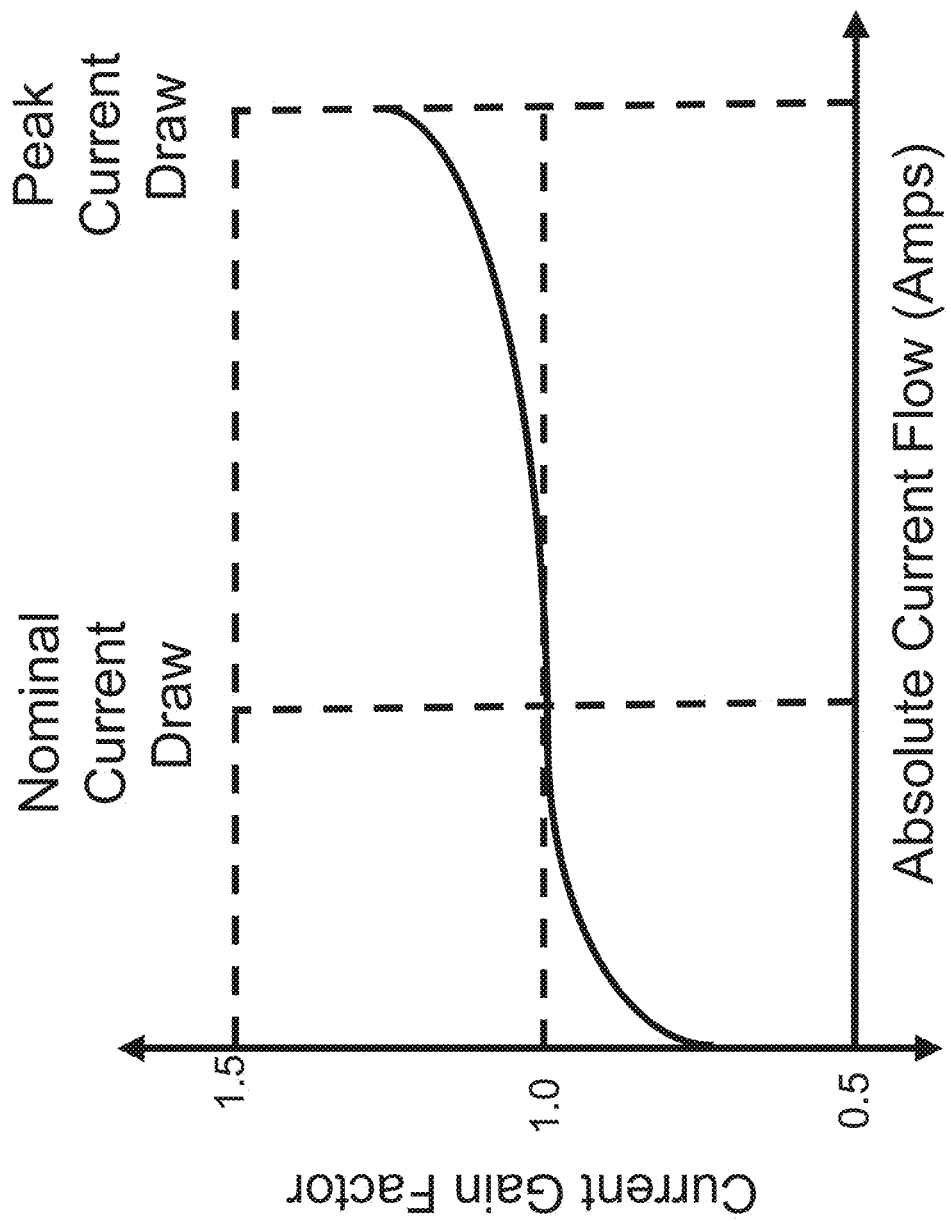
FIG. 3 shows a plot of current gain factor vs. absolute current flow, according to an embodiment.

In contrast, the controller 170 determines the current gain factor, and determines an adjusted current value in Amp-Hrs from the determined current value based on the current gain factor. The adjusted current value is a modified current value based on current, temperature and/or SOC (i.e., based on their respective gain factors as described in detail herein). The current gain factor is a unit less multiplier that has a value equal to one when the determined current value is equal to the current threshold (e.g., a nominal current value or within a value range). The current gain factor has a value greater than 1 when the determined current value is greater than the current threshold, and has a value less than 1 when the determined current value is less than the current threshold. For example, FIG. 3 shows a plot of various values of the current gain factor for various current values determined by dividing the current value supplied drawn from the energy storage device 130 by the nominal current value drawn therefrom. Peak current draw indicates the maximum current which can be drawn from the energy storage device 130 and sets an upper bound of the gain factor. Multiplying the current gain factor with the current value yields the adjusted current value. As shown in FIG. 3, the current gain factor is asymmetric about the nominal current draw. In other embodiments, the current gain factor may increase linearly, logarithmically, exponentially or in any other suitable function about the nominal current draw.

The controller 170 is configured to determine an estimated SOH of the energy storage device 130 based on the adjusted current value. Particularly, the controller 170 is configured to determine a cumulative adjusted current value from a plurality of the adjusted current values, and the estimated SOH is determined based on the cumulative adjusted current value. The cumulative adjusted current value may, for example, be an adjusted coulomb counter which is a sum or an integral over time of a plurality of the adjusted current values. Determining the estimated SOH may include determining a difference between a total capacity of the energy storage device 130 and a consumed capacity of the energy storage device 130, the consumed capacity based on a sum of adjusted current values drawn from or supplied to the energy storage device 130 over a predefined period of time. For example, conventional estimation of SOH is based on a simple counter of Amp-Hrs supplied to or drawn from the energy storage device 130 and may be expressed as a fraction or percentage of remaining life in Amp-Hrs of the energy storage device 130. In contrast, the estimated SOH is a counter of adjusted Amp-Hrs in which fractional Amp-Hrs (i.e., the current value) are accumulated in a running counter as they occur but when the current value is less than the current threshold (e.g., the nominal current value), the Amp-Hrs are discounted by the gain factor (i.e., a gain factor having a value less than 1 but greater than 0) to determine the adjusted current value (i.e., adjusted Amp-Hrs), and when current value is higher than the current threshold, the gain factor is greater than 1 that results in an adjusted current value being higher than the nominal current value and, therefore higher accumulated Amp-Hrs.

Figure 2:
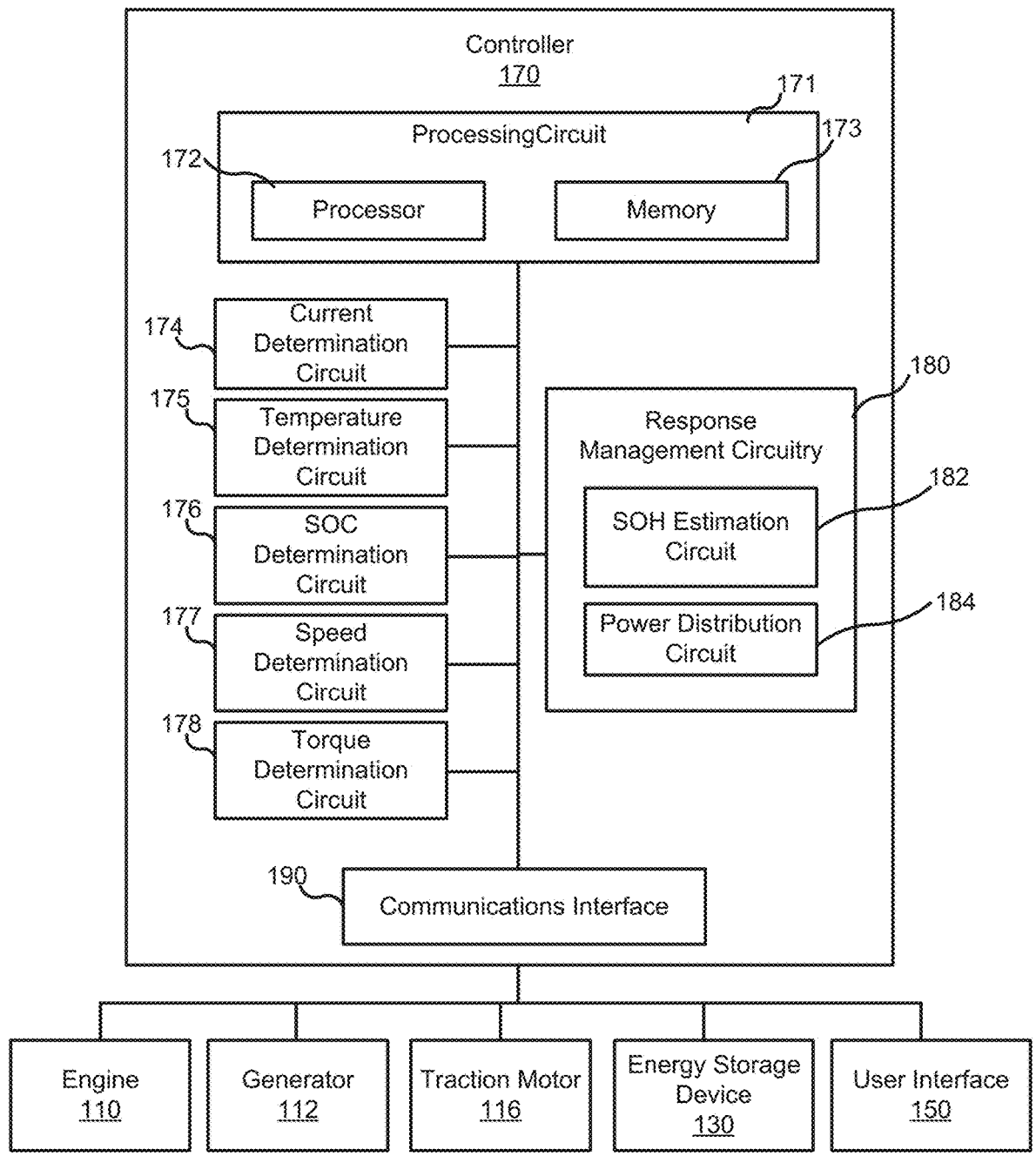
FIG. 2 is a schematic block diagram of the controller of FIG. 1, according to an embodiment.

The controller 170 is also configured to generate a SOH signal indicative of the estimated SOH of the energy storage device, and indicate the estimated SOH on a user interface, for example, the user interface 150 shown in FIG. 2. The user interface 150 may include, for example, an indicator lamp or a gage configured to indicate or display the estimated SOH determined by the controller. The SOH signal may activate the user interface 150, for example, available on a dashboard of a vehicle including the system 100 so as to indicate the SOH of the energy storage device 130 to a user. In other embodiments, the controller 170 may also be configured to generate a low SOH signal once the SOH of the energy storage device 130 is less than or equal to a low SOH threshold. The low SOH signal may be configured to activate a malfunction indicator lamp (MIL) indicating to the user that the SOH of the energy storage device 130 is low (i.e., the energy storage device 130 is close to the end of its life) prompting the user to replace the energy storage device 130 with a new energy storage device.

In some embodiments, the controller 170 may also be configured to a control a power distribution split between the energy storage device 130 and the engine 110 based on the estimated SOH. For example, if the estimated SOH is greater than a threshold, for example, greater than a range of 5% to 10% SOH (e.g., greater than 5%, 6%, 7%, 8%, 9% or 10% inclusive of all ranges and values therebetween), the controller 170 may selectively draw more power from the energy storage device 130 than the engine 110, depending on the operating conditions of the system 100. For example, the system 100 may include a vehicle, and the controller 170 may be configured to selectively draw more power from the energy storage device 130 than the engine 110 based on driving conditions of the vehicle (e.g., road grade, weather, SOC of the energy storage device 130, traffic conditions, etc.). This provides the benefit of decreasing fuel consumption, therefore increasing mileage and reducing emissions. In contrast, if the estimated SOH is equal to or less than the threshold, the controller 170 may be configured to draw more power from the engine 110 than the energy storage device 130 so to prevent or slow down complete failure of the energy storage device 110 (e.g., due to the estimated SOH reducing to about 0% which corresponds to the energy storage device incapable of storing any charge and is, therefore at the end of its life). Furthermore, controller 170 may generate a fault code, light up a malfunction indicator lamp (MIL) and/or indicate to the user interface 150 that the energy storage device 130 should be replaced.

Drawing from or supplying current to the energy storage device 130 at a temperature which does not satisfy a temperature threshold, for example, a fixed value or a temperature range (e.g., a range of 10 degrees to 45 degrees Celsius), may also cause greater damage to the energy storage device 130 relative to when the current is drawn from or supplied to the energy storage device 130 at a temperature satisfying the temperature threshold. In some embodiments, the controller 170 may also be configured to determine a temperature of the energy storage device 130. In response to the temperature not satisfying the temperature threshold, the controller 170 is configured to determine a temperature gain factor. In such embodiments, the controller 170 determines the adjusted current value also based on the temperature gain factor. For example, the controller 170 may determine the adjusted current value by multiplying the determined current value with each of the current gain factor and the temperature gain factor. In particular embodiments, the temperature gain factor has a value greater than 1 when the determined temperature value is greater than or less than the temperature threshold.

Furthermore, drawing from or supplying current to the energy storage device 130 at a SOC which does not satisfy a SOC threshold, for example, a SOC range of 10% to 90% SOC, may also cause greater damage to the energy storage device 130 relative to when the current is drawn from or supplied to the energy storage device 130 at a SOC satisfying the SOC threshold. For example, a SOC less than the SOC threshold may correspond to the energy storage device 130 being in a state of deep discharge and a SOC greater than the SOC threshold may correspond to the energy storage device 130 being near full charge. In some embodiments, the SOC range may between 29% to 71%, between 30% to 70%, between 48% to 52%, inclusive, or any other suitable range.

Drawing current from or supplying current to the energy storage device 130 under conditions where SOC does not satisfy the SOC threshold may cause greater damage to the energy storage device 130 and therefore, a greater impact on the SOH of the battery relative to drawing from or supplying current to the energy storage device 130 when the determined SOC satisfies the SOC threshold. Therefore, in some embodiments, the controller 170 is further configured to determine a SOC of the energy storage device 130. In response to the SOC not satisfying the SOC threshold, the controller 170 is configured to determine a SOC gain factor, and determine the adjusted current value also based on the SOC gain factor. For example, the controller 170 may determine the adjusted current value by multiplying the determined current value with each of the current gain factor and the SOC gain factor. The SOC gain factor may have a value greater than 1 when the determined SOC value is greater than or less than the SOC threshold.

In some embodiments in which the current is supplied to or drawn from the energy storage device 130 under conditions in which each of the determined current, temperature and SOC do not satisfy their respective thresholds, the adjusted current value is determined from the determined current value based on each of the current gain factor, the temperature gain factor and the SOC gain factor. For example, the current value may be multiplied with each of the current, temperature and SOC gain factors to determine the adjusted current value, which is then use to determine an estimated SOH.

In various embodiments, the controller 170 may comprise an electronic control unit configured to receive various signals from the engine 110 (e.g., via the ECM 111), the generator 112 (e.g., via the generator electronics 113), the traction motor 116 (e.g., via the motor electronics 115) and the energy storage device 130 (e.g. via the BMS 134). As shown in FIG. 2, the controller 170 may include a processing circuit 171 having a processor 172 and a memory 173, a current determination circuit 174, a temperature determination circuit 175, a SOC determination circuit 176, a speed determination circuit 177, a torque determination circuit 178 and a communications interface 190. The controller 170 may also include a response management circuitry 180 having a SOH estimation circuit 182 and a power distribution circuit 184.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables, algorithms, or instructions.

In one configuration, the current determination circuit 174, the temperature determination circuit 175, the SOC determination circuit 176, the speed determination circuit 177, the torque determination circuit 178, and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the current determination circuit 174, the temperature determination circuit 175, the SOC determination circuit 176, the speed determination circuit 177, the torque determination circuit 178, and the response management circuitry 180 are embodied as hardware units, such as electronic control units. As such, the current determination circuit 174, the temperature determination circuit 175, the SOC determination circuit 176, the speed determination circuit 177, the torque determination circuit 178, and the response management circuitry 180 may be embodied as one or more circuitry components including, but not limited to, processing circuitry, network interfaces, peripheral devices, input devices, output devices, sensors, etc. In some embodiments, the current determination circuit 174, the temperature determination circuit 175, the SOC determination circuit 176, the speed determination circuit 177, the torque determination circuit 178, and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the current determination circuit 174, the temperature determination circuit 175, the SOC determination circuit 176, the speed determination circuit 177, the torque determination circuit 178, and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the current determination circuit 174, the temperature determination circuit 175, the SOC determination circuit 176, the speed determination circuit 177, the torque determination circuit 178, and/or the response management circuitry 180 may also include programmable hardware devices such as field programmable gate arrays, programmable array logic, programmable logic devices or the like. In this regard, the current determination circuit 174, the temperature determination circuit 175, the SOC determination circuit 176, the speed determination circuit 177, the torque determination circuit 178, and the response management circuitry 180 may include one or more memory devices for storing instructions that are executable by the processor(s) of the current determination circuit 174, the temperature determination circuit 175, the SOC determination circuit 176, the speed determination circuit 177, the torque determination circuit 178, and the response management circuitry 180. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect the current determination circuit 174, the temperature determination circuit 175, the SOC determination circuit 176, the speed determination circuit 177, the torque determination circuit 178, and the response management circuitry 180. Thus, the depicted configuration represents the aforementioned arrangement where the current determination circuit 174, the temperature determination circuit 175, the SOC determination circuit 176, the speed determination circuit 177, the torque determination circuit 178, and the response management circuitry 180 are embodied as machine or computer-readable media. However, as mentioned above, this illustration is not meant to be limiting as the present disclosure contemplates other embodiments such as the aforementioned embodiment the current determination circuit 174, the temperature determination circuit 175, the SOC determination circuit 176, the speed determination circuit 177, the torque determination circuit 178, and the response management circuitry 180 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the current determination circuit 174, the temperature determination circuit 175, the SOC determination circuit 176, the speed determination circuit 177, the torque determination circuit 178, and the response management circuitry 180 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 190 may include wired and/or wireless interfaces (e.g., jacks, antennas, transmitters, receivers, transceivers, wire terminals, etc.) for conducting data communications with various systems, devices, or networks. For example, the communications interface 190 may include an Ethernet card and port for sending and receiving data via an Ethernet-based communications network and/or a Wi-Fi transceiver for communicating with engine 110, the generator 112, the traction motor 116 and the energy storage device 130. The communications interface 190 may be structured to communicate via local area networks or wide area networks (e.g., the Internet, etc.) and may use a variety of communications protocols (e.g., IP, LON, Bluetooth, ZigBee, radio, cellular, near field communication, etc.).

The current determination circuit 174 is configured to determine a current value drawn from and/or supplied to the energy storage device 130 over a predefined period of time. For example, the current determination circuit 174 may receive information from the BMS 134 corresponding to the current value (e.g., determined by a current sensor included in the BMS 134) and determine the current value input or extracted from the energy storage device 130 over the period of time (i.e., charge) in Amp-hr.

The temperature determination circuit 175 is configured to determine a temperature of the energy storage device 130. For example, the temperature determination circuit 175 may be configured to receive a temperature signal from the temperature sensor 132 via the BMS 134 and determine the operating temperature of the energy storage device 130 therefrom.

The SOC determination circuit 176 is configured to receive a SOC signal, for example, from the BMS 134 and determine the SOC of the energy storage device 130 therefrom.

The speed determination circuit 177, and the torque determination circuit 178 are configured to determine a speed and torque, respectively desired from the system 100 by the load 120, for example, based on a user input or otherwise detected or determined from one or more sensors.

The SOH estimation circuit 182 is configured to estimate the SOH of the energy storage device 130. Expanding further the SOH estimation circuit 182 is configured to determine a current gain factor in response to the current value determined by the current determination circuit 174 not satisfying the current threshold, as previously described herein. The SOH estimation circuit 182 is also configured to determine a temperature gain factor in response to the determined temperature value not satisfying the temperature threshold, as previously described herein. Furthermore, the SOH estimation circuit 182 is configured to determine a SOC gain factor in response to the determined SOC not satisfying the SOC threshold, as previously described herein.

The SOH estimation circuit 182 is configured to determine an adjusted current value from the determined current value based on the current gain factor, the temperature gain factor and/or the SOC gain factor. The SOH estimation circuit 182 then uses the adjusted current value to estimate the SOH of the energy storage device 130. For example, the SOH estimation circuit 182 may determine a cumulative adjusted current value from a plurality of adjusted current values (e.g., a sum or integral thereof), and the SOH estimation circuitry 182 determines the estimated SOH from the cumulative adjusted current value. In some embodiments, the communications interface 190 may generate a SOH signal indicating the SOH of the energy storage device 130 to a user on the user interface 150 (e.g., activate a SOH gage on a dashboard of a vehicle including the system 100).

The power distribution circuit 184 is configured to control power draw split between the engine 110 and generator 112, or the energy storage device 130 based on the desired speed and/or desired torque. For example, the power distribution circuit 184 may be configured to drive a vehicle including the system 100 via the traction motor 116 using power drawn from the engine 110 and the generator 112, or the energy storage device 130 based on at least one of the desired torque from the engine 110 and the generator 112, or the desired speed from the engine 110. In some embodiments, if the SOH of the energy storage device 130 is below a predefined low SOH threshold level (e.g., a 5% SOH), the power distribution circuit 184 may be configured to draw power solely from the engine 110 and the generator 112, until the energy storage device 130 is replaced with a new energy storage device 130.

Figure 4:
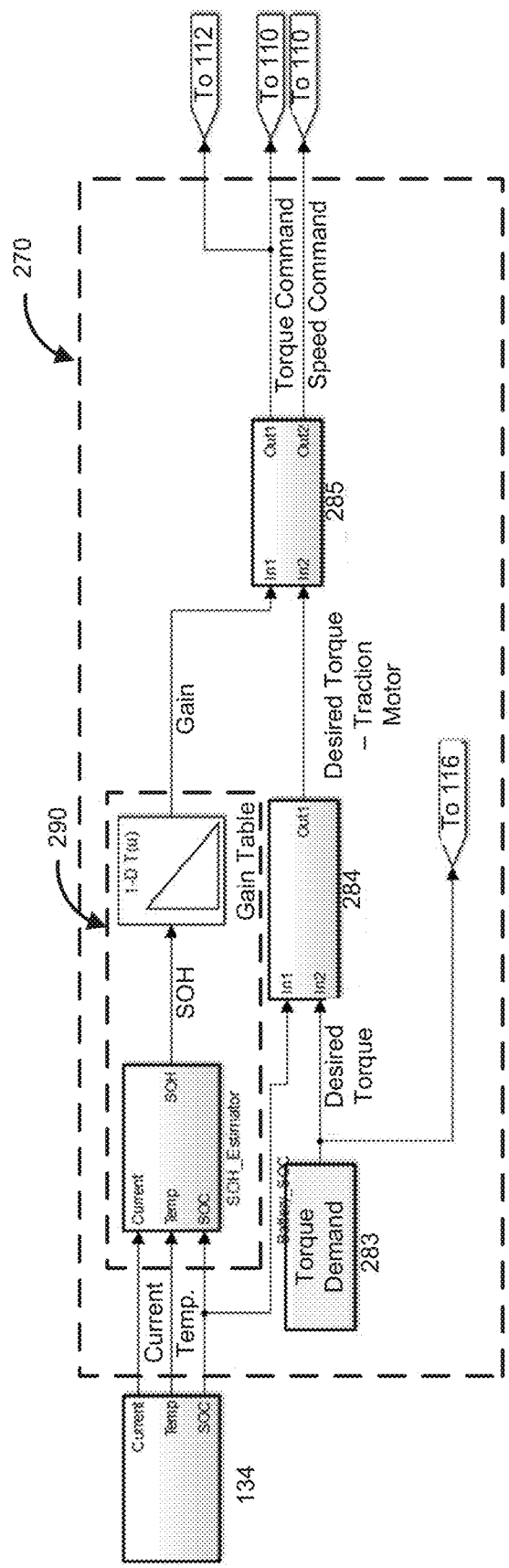
FIG. 4 is a schematic block diagram of a controller which may be used by the controller of FIG. 1 to estimate SOH of the energy storage device of FIG. 1 and balance load demand from the energy storage device relative to an engine of the system of FIG. 1, according to an embodiment.

FIG. 4 is a schematic block diagram of a control circuit 270, according to another embodiment. While shown as being an independent circuit, the components of the control circuit 270 may be implemented by one or more circuits of the controller 170, in various implementations. The control circuit 270 is configured to receive data corresponding to current drawn from or supplied to the energy storage device 130, the temperature and the SOC of the energy storage device 130, for example, from the BMS 134. The control circuit 270 also includes a machine manager block 283 configured to receive or determine desired torque from the system 100. The machine manager block 283 may also transmit the desired torque information to the motor electronics 115.

The control circuit 270 also includes a power split block 284 configured to determine a desired torque from engine 110 and generator 112, or traction motor 116 based on SOH of energy storage device 130 and the desired torque, a. The control circuit 270 also includes a torque split block 285 configured to provide split torque demand between the engine 110 and the generator 112.

The control circuit 270 includes a SOH estimation block 290. FIG. 5A is schematic block diagram of the SOH estimation block 290, according to a particular embodiment. The SOH estimation block 290 includes a current gain block 291 configured to determine a current gain factor in response to the determined current not satisfying the current threshold, as previously described herein. FIG. 5B shows a plot of current gain factor vs. current draw. When the current draw or input satisfies the current threshold, the current gain factor is 1. The current gain factor is greater than 1 for current draw or input being greater than current threshold, and smaller than 1 but greater than 0, for current draw or input being less than current threshold.

The SOH estimation block 290 also includes a temperature gain block 292 configured to determine a temperature gain factor in response to the determined temperature not satisfying the temperature threshold, as previously described herein. FIG. 5C shows a plot of temperature gain factor vs.

operating temperature of the energy storage device 130. When the operating temperature of the energy storage device 130 satisfies the temperature threshold, the temperature gain factor is 1. The temperature gain factor is greater than 1 when the operating temperature of the energy storage device 130 is above or below the temperature threshold.

The SOH estimation block 290 also includes a temperature gain block 292 configured to determine a temperature gain factor in response to the determined temperature of the energy storage device 130 not satisfying the temperature threshold, as previously described herein. FIG. 5C shows a plot of temperature gain factor vs. operating temperature of the energy storage device 130. When the operating temperature of the energy storage device 130 satisfies the temperature threshold, the temperature gain factor is 1. The temperature gain factor is greater than 1 when the operating temperature of the energy storage device 130 is greater than or less than the temperature threshold.

The SOH estimation block 290 also includes a SOC gain block 293 configured to determine a SOC gain factor in response to the determined SOC of the energy storage device 130 not satisfying the temperature threshold, as previously described herein. FIG. 5C shows a plot of SOC gain factor vs. SOC of the energy storage device 130. When the SOC of the energy storage device 130 satisfies the SOC threshold, the SOC gain factor is 1. The SOC gain factor is greater than 1 when the operating SOC of the energy storage device 130 is greater than or less than the SOC threshold.

The SOH estimation block 290 also includes a gain factor multiplier block 294 configured to multiply each of the current gain factor, the temperature gain factor and the SOC gain factor to determine an overall gain factor. The overall gain factor is multiplied with the determined current value in an adjusted current value block 295 to determine the adjusted current value. An absolute value block 296 is configured to determine the absolute adjusted current value from the adjusted current value. For example, if the adjusted current value is a negative number (e.g., due to current being supplied to the energy storage device 130), the adjusted current value is multiplied with −1 to determine the absolute adjusted current value. A unit delay block 297 is configured to hold and delay input to a SOH estimator block 298 by one iteration or a predefined iteration (e.g., predefined by a user).

The SOH estimator block 298 is configured to determine the estimated SOH based on the absolute adjusted current value (e.g., a cumulative adjusted current value), as previously described herein. Referring again to FIG. 4, the SOH estimator block 298 may determine SOH versus expected SOH based on service hours or vehicle mileage. The estimated SOH may be used by the torque split block 285 to determine necessary torque or speed commands to the engine 110 and the generator 112. This may indicate high step in torque without immediate change in speed which corresponds to a more aggressive use of the engine 110 to save energy storage device 130 power, or for more efficiency, this may correspond to a smaller change in torque along with a greater rise in speed that would result in the energy storage device 130 providing more power to the traction motor 116. In some embodiments, the allocation of power draw between the engine 110/generator 112 and the energy storage device 130 may be accomplished via an adjustment factor, or may simply be a constraint placed on the engine 110/generator 112 or energy storage device 130 allocation at the point of power-split determination.

Figure 6A:
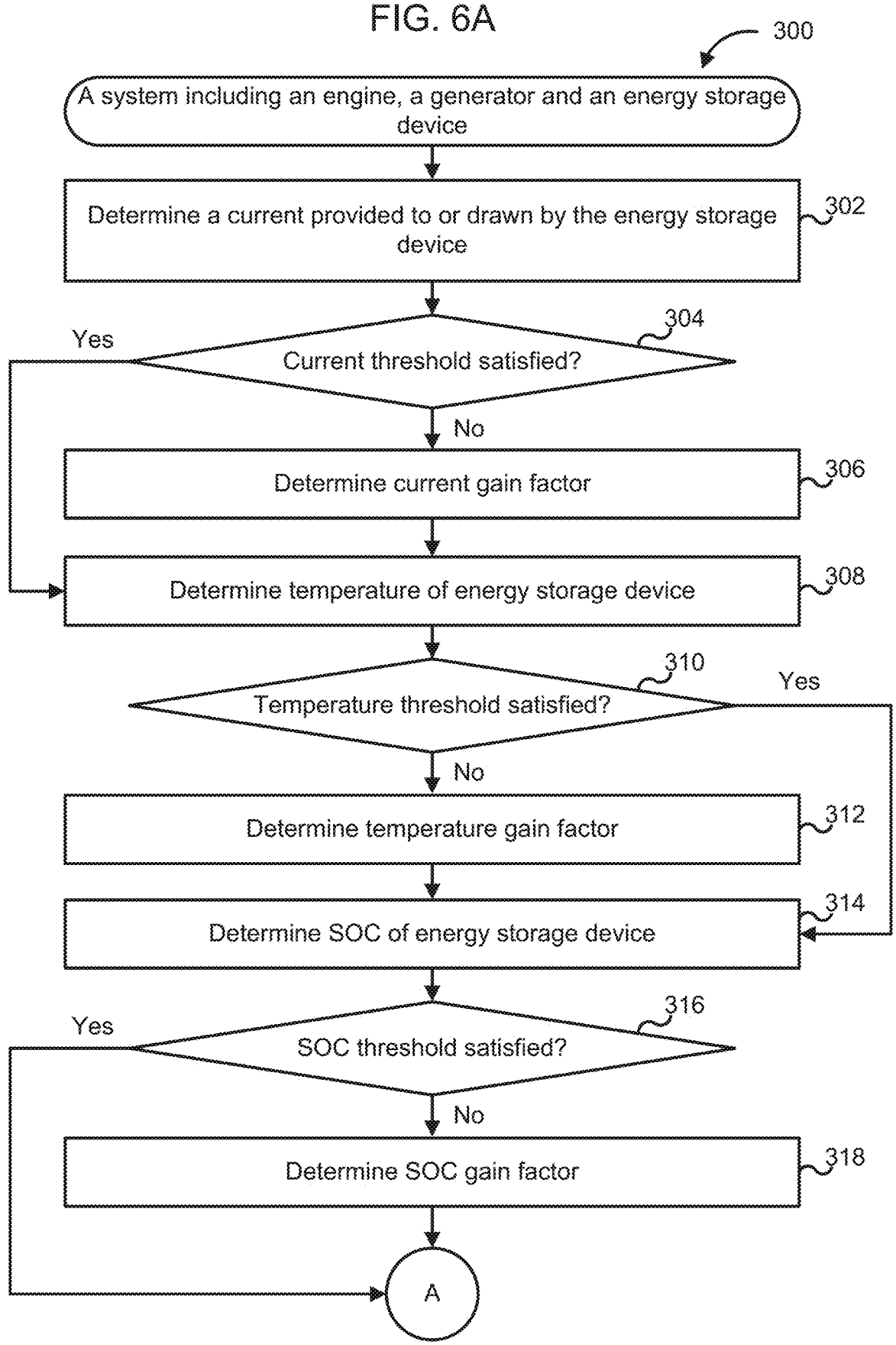
FIG. 6A-6B are schematic flow diagrams of method for estimating an SOH of an energy storage device, according to an embodiment.
Figure 6B:
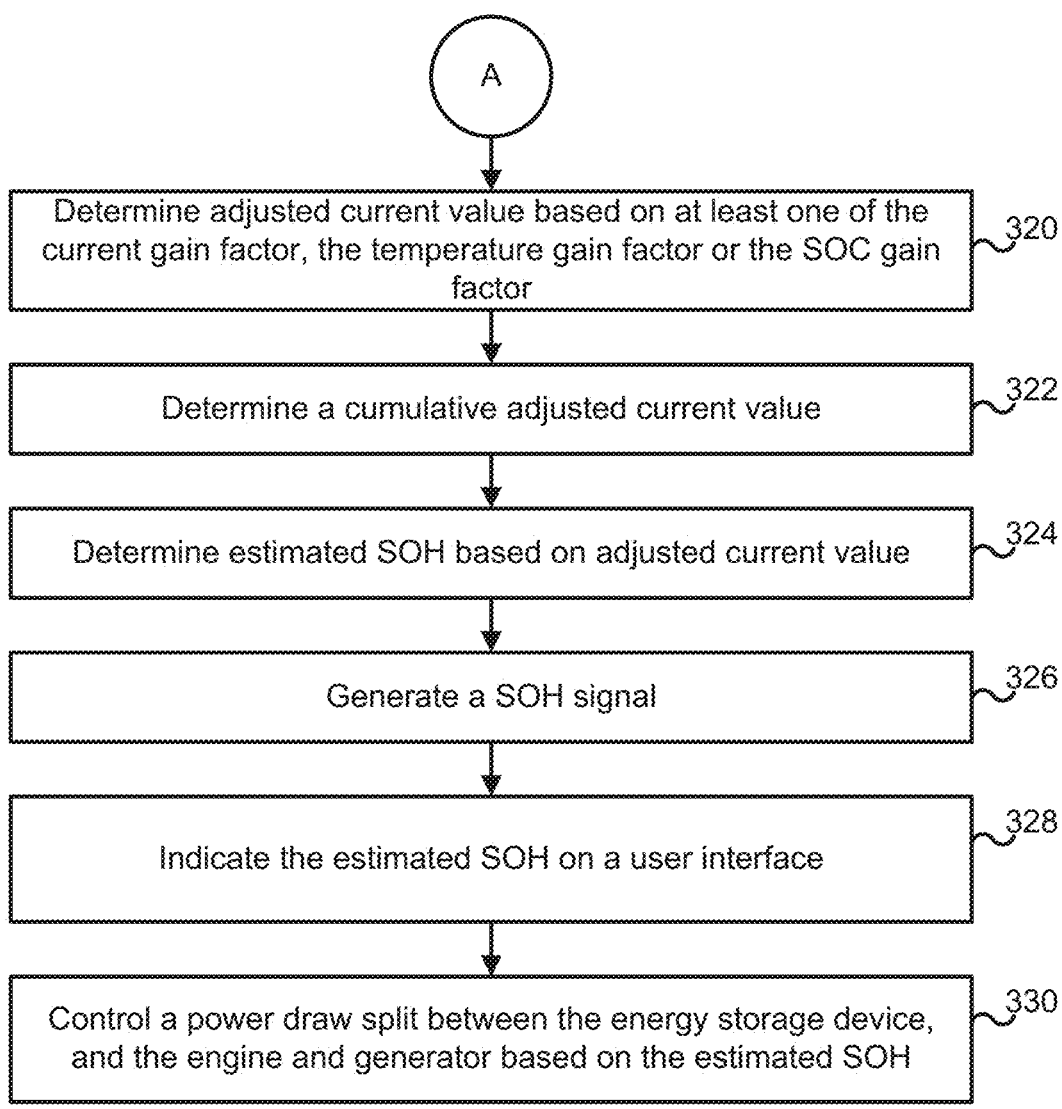

FIGS. 6A-6B are schematic flow diagrams of an example method 300 for estimating an SOH of an energy storage device (e.g., the energy storage device 130) included in a system (e.g., the system 100) that also includes an engine (e.g., the engine 110) and a generator (e.g., the generator 112), according to an embodiment. While the operations of method 300 are generally described with respect to the controller 170 and the system 100, it should be understood that the operations of the method 300 can be implemented in any controller or electronic control unit for estimating a SOH of an energy storage device 130.

The method 300 includes determining a current value drawn from or supplied to the energy storage device over a predefined period of time, at 302. For example, the controller 170 may determine the current value drawn from or supplied to the energy storage device 130 based on input received from the BMS 134. At 304, a determination is made regarding whether the current value satisfies a current threshold, for example, by the controller 170. If the current value does not satisfy the current threshold (304:NO), the controller 170 determines a current gain factor, at 306, as previously described herein. The current threshold value may be based on a total capacity of the energy storage device 130, a rated number of cycles of the energy storage device 130 and a rated life of the energy storage device 130, as previously described herein.

If the current threshold is satisfied at 304 (304:YES), or after determining the current gain factor at 306, a temperature of the energy storage device is determined, at 308 (e.g., by the BMS 134). If the temperature does not satisfy a temperature threshold, at 310 (310:NO), the controller 170 determines a temperature gain factor, at 312 (e.g., by the controller 170).

If the temperature satisfies the temperature threshold (310:YES), or after determining the temperature gain factor, a SOC of the energy storage device is determined, at 314 (e.g., by the BMS 134. If the SOC does not satisfy a SOC threshold, at 316 (316:NO), a SOC gain factor is determined at 318.

At 320, the controller 170 determines an adjusted current value from the determined current value based on at least one of the current gain factor, the temperature gain factor or the SOC gain factor, as previously described herein. In some embodiments, the controller 170 also includes determining a cumulative adjusted current value from a plurality of the adjusted current values (e.g., a sum or integral of the adjusted current values), at 322. At 324, the controller 170 determines an estimated SOH of the energy storage device 130 based on the adjusted current value, for example, based on the cumulative adjusted current value. Determining the estimated SOH may include determining a difference between a total capacity of the energy storage device 130 and a consumed capacity of the energy storage device 130, the consumed capacity based on a sum of adjusted current values drawn from the energy storage device 130 over a predefined time, as previously described herein. The controller 170 generates a SOH signal, at 326. The SOH signal is communicated to a user interface and indicates the estimated SOH to a user on the user interface (e.g., the user interface 150), at 328

In some embodiments, the method 300 may also include controlling a power draw split between the energy storage device 130, and the engine 110 and the generator 112 by the controller 170 based on the estimated SOH, at 330. For example, the controller 170 may be configured to control power draw from the generator 112 or the energy storage device 130 based on the determined power distribution split.

Although an example computing device has been described in FIG. 2, implementations described in this specification can be implemented in other types of digital electronic, or in computer software, firmware, or hardware, including the structures disclosed in this specification and their structural equivalents, or in combinations of one or more of them.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for determining a state of health (SOH) of an energy storage device, comprising:
a controller configured to be coupled to the energy storage device, the controller configured to:
receive a current value drawn from or supplied to the energy storage device over a predefined period of time;
in response to the current value being greater than or equal to a current threshold, determine a current gain factor value;
determine an adjusted current value from the received current value based on the current gain factor value;
determine an estimated SOH of the energy storage device based on the adjusted current value, the estimated SOH indicating a remaining life of the energy storage device;
control a power distribution split between the energy storage device and an engine based on the estimated SOH; and
indicate the estimated SOH of the energy storage device on a user interface.

2. The system of claim 1, wherein the controller is further configured to determine a cumulative adjusted current value from a plurality of the adjusted current values, and wherein the estimated SOH is determined based on the cumulative adjusted current value.

3. The system of claim 1, wherein the system is included in a vehicle having the engine, and wherein the controller is further configured to control the power distribution split between the energy storage device and the engine based on the estimated SOH, a desired torque output, and a desired speed output.

4. The system of claim 1, wherein determining the estimated SOH comprises determining a difference between a total capacity of the energy storage device and a consumed capacity of the energy storage device, the consumed capacity based on a sum of adjusted current values drawn from the energy storage device over a predefined period of time.

5. The system of claim 1, wherein the current gain factor value is greater than 1 when the received current value is greater than the current threshold, and wherein the current gain factor value is less than 1 when the received current value is less than the current threshold.

6. The system of claim 1, wherein the controller is further configured to:
receive a temperature of the energy storage device; and
in response to the temperature not satisfying a temperature threshold, determine a temperature gain factor;
wherein determining the adjusted current value from the received current value is also based on the temperature gain factor.

7. The system of claim 6, wherein the temperature gain factor has a value greater than 1 when the received temperature value is greater than or less than the temperature threshold.

8. The system of claim 1, wherein the controller is further configured to:
receive a state of charge (SOC) of the energy storage device; and
in response to the SOC not satisfying a SOC threshold, determine a SOC gain factor;
wherein determining the adjusted current value from the received current value is also based on the SOC gain factor.

9. The system of claim 8, wherein the SOC threshold comprises a range between approximately 10% SOC and 90% SOC of the energy storage device.

10. The system of claim 8, wherein the SOC gain factor has a value greater than 1 when the received SOC value is greater than or less than the SOC threshold.

11. A vehicle, comprising:
an energy storage device; and
a controller configured to:
receive a current value drawn from or supplied to the energy storage device over a predefined period of time;

in response to the current value being greater than or equal to a current threshold, determine a current gain factor value;

determine an adjusted current value from the received current value based on the current gain factor value;

determine an estimated SOH of the energy storage device based on the adjusted current value, the estimated SOH indicating a remaining life of the energy storage device;

control a power distribution split between the energy storage device and an engine based on the estimated SOH; and selectively drive the vehicle via a traction motor using power drawn from the energy storage device according to the power distribution split based on the estimated SOH of the energy storage device.

12. The vehicle of claim 11, wherein the controller is further configured to determine a cumulative adjusted current value from a plurality of the adjusted current values, and wherein the estimated SOH is determined based on the cumulative adjusted current value.

13. The vehicle of claim 11, wherein the determining the estimated SOH comprises determining a difference between a total capacity of the energy storage device and a consumed capacity of the energy storage device, the consumed capacity based on a sum of adjusted current values drawn from the energy storage device over a predefined time period.

14. The vehicle of claim 11, wherein the controller is further configured to:

receive a temperature of the energy storage device; and in response to the temperature not satisfying a temperature threshold, determine a temperature gain factor, wherein determining the adjusted current value from the received current value is also based on the temperature gain factor.

15. The vehicle of claim 11, wherein the controller is further configured to:

measure a state of charge (SOC) of the energy storage device; and in response to the SOC not satisfying a SOC threshold, determine a SOC gain factor, wherein determining the adjusted current value from the received current value is also based on the SOC gain factor.

16. A method for determining a state of health (SOH) of an energy storage device, comprising:

receiving a current value drawn from or supplied to the energy storage device over a period of time;

in response to the current value being greater than or equal to a current threshold, determine a current gain factor value;

determining an adjusted current value from the received current value based on the current gain factor value;

determining an estimated SOH of the energy storage device based on the adjusted current value, the estimated SOH indicating a remaining life of the energy storage device;

controlling a power distribution split between the energy storage device and an engine of a vehicle based on the estimated SOH; and indicating the estimated SOH of the energy storage device on a user interface.

17. The method of claim 16, further comprising determining a cumulative adjusted current value from a plurality of the adjusted current values, and wherein the estimated SOH is determined based on the cumulative adjusted current value.

18. The method of claim 16, further comprising controlling the power distribution split between the energy storage device and the engine of the vehicle based on the estimated SOH, a desired torque output, and a desired speed output.

19. The method of claim 18, further comprising:

receiving a temperature of the energy storage device; and in response to the temperature not satisfying a temperature threshold, determining a temperature gain factor, wherein determining the adjusted current value from the received current value is also based on the temperature gain factor.

20. The method of claim 18, further comprising:

receiving a state of charge (SOC) of the energy storage device; and in response to the SOC not satisfying a SOC threshold, determining a SOC gain factor, wherein determining the adjusted current value from the received current value is also based on the SOC gain factor.

* * * * *